United States Patent [19]

Kasai et al.

[11] Patent Number: 5,112,941
[45] Date of Patent: May 12, 1992

[54] AROMATIC POLYIMIDE SEPARATION MEMBRANE

[75] Inventors: Tetsuo Kasai, Machida; Yoshiteru Kobayashi, Kitakyushu, both of Japan

[73] Assignee: Mitsubishi Kasei Corporation, Tokyo, Japan

[21] Appl. No.: 544,841

[22] Filed: Jun. 27, 1990

[51] Int. Cl.$^5$ .................. C08G 8/02; C08G 63/00; C08G 2/00; C08G 69/26

[52] U.S. Cl. .................................... 528/353; 55/16; 55/68; 55/158; 528/128; 528/176; 528/183; 528/226; 528/228; 528/229; 528/348

[58] Field of Search ............... 528/353, 128, 176, 183, 528/226, 228, 229, 348; 55/16, 68, 158

[56] References Cited

U.S. PATENT DOCUMENTS

| | | | |
|---|---|---|---|
| 4,657,564 | 4/1987 | Langsam | 55/16 |
| 4,717,394 | 1/1988 | Hayes | 55/16 |
| 4,759,776 | 7/1988 | Langsam et al. | 55/16 |
| 4,828,585 | 5/1989 | Chiao | 55/16 |

FOREIGN PATENT DOCUMENTS

| | | |
|---|---|---|
| 043265 | 1/1982 | European Pat. Off. |
| 0226141 | 6/1986 | European Pat. Off. |
| 0194546 | 9/1986 | European Pat. Off. |
| 2258412 | 1/1975 | France |
| 64-22320 | 7/1987 | Japan |

OTHER PUBLICATIONS

Patent Abstracts of Japan, vol. 9, No. 222 (C-302) [1945] and JP-A-60 86 132.
Patent Abstracts of Japan, vol. 12, No. 248 (C-511) [3095] and JP-A-63 36 804.
Patent Abstracts of Japan, vol. 13, No. 199 (C-594) [3547] and JP-A-1 22 230.

*Primary Examiner*—John Kight, III
*Assistant Examiner*—T. Mosley
*Attorney, Agent, or Firm*—David G. Conlin; George W. Neuner; Peter F. Corless

[57] ABSTRACT

An aromatic polyimide separation membrane prepared by subjecting an aromatic polyimide membrane to fluorine treatment with an active fluorine is described. The aromatic polyimide separation membrane according to the present invention has an extremely high selectivity and gas permeability, and therefore, is useful as a membrane for separation of gas mixtures or liquid mixtures.

7 Claims, No Drawings

AROMATIC POLYIMIDE SEPARATION MEMBRANE

BACKGROUND OF THE INVENTION

The present invention relates to an aromatic polyimide separation membrane prepared by fluorination of an aromatic polyimide membrane with active fluorine. The aromatic polyimide separation membrane according to the present invention has an extremely high selectivity and is useful as a membrane for separation of gas mixtures or liquid mixtures.

Japanese Patent Application Laid-Open (KOKAI) Nos. 57-15819/1982, 58-3603/1983 and 58-8512/1983 describe gas separation membranes prepared from a polyimide obtained from a biphenyltetracarboxylic acid component and an aromatic diamine component. However, although the selectivity of hydrogen against carbon monoxide is relatively high, the permeation rate of hydrogen is not sufficiently high. Japanese Patent Publication (KOKOKU) No. 55-41802/1980 and Japanese Patent Application Laid-Open (KOKAI) Nos. 63-111921/1988 and 63-123420/1988 describe polyimide separation membranes having high gas permeation rates, however, the membranes disclosed in these documents cannot be said sufficient in separation efficiency. Japanese Patent Application Laid-Open Nos. 62-155919/1987 and 63-171619/1988 describe separation membranes prepared by treating substituted polyacetylenes with fluorine, and Japanese Patent Application Laid-Open No. 64-22320/1989 describes a treatment of silicone-based membranes with fluorine, however, the separation membranes of these documents are inferior in durability such as heat resistance and solvent resistance.

The present inventors have carried out extensive research on a separation membrane which shows a higher selectivity than known separation membranes and satisfies the requirements for a useful separation membrane, i.e., a separation membrane excellent in heat resistance, solvent resistance, stability in membrane characteristics and other properties required. As a result, the present inventors have found that a membrane prepared by fluorinating an aromatic polyimide membrane with active fluorine shows an extremely high performance as a separation membrane. The present invention has been accomplished based on this finding.

The modification of polyolefin porous membrane by fluorine treatment has been known in the art, however, in this technique, it has been very difficult to avoid the deterioration in membrane properties due to fluorine treatment. On the contrary, in the present invention, an aromatic polyimide membrane is subjected to fluorination without causing such deterioration. This makes it possible to carry out the fluorination under a wide range of conditions to secure the advantage in practice. It has been also found that an aromatic polyimide membrane subjected to fluorination is improved especially in selectivity.

Further, an aromatic polyimide membrane having a hydrogen permeability coefficient larger than a specific level is found to be effectively fluorinated due to large diffusion rate of active fluorine into the membrane, and therefore, the separation membrane of the present invention can be advantageously obtained by using such an aromatic polyimide membrane.

The separation membrane according to the present invention has a good durability in addition to a high selectivity and a high gas permeability, and is highly useful for practical use.

SUMMARY OF THE INVENTION

The present invention provides an aromatic polyimide separation membrane prepared by subjecting an aromatic polyimide membrane to fluorination with active fluorine.

DETAILED DESCRIPTION OF THE INVENTION

The aromatic polyimide separation membrane of the present invention (whereinafter may be referred to as "the present separation membrane" or "the present aromatic polyimide separation membrane") is prepared from a membrane of a polyimide comprising a constitutional repeating unit represented by the following formula (I).

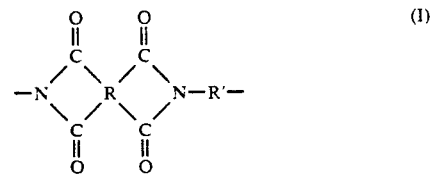

The polyimide membrane is preferred to have a hydrogen permeability coefficient at 30° C. of not less than $10^{-9}\,cm^3(STP)\cdot cm/cm^2\cdot sec\cdot cmHg$, STP being standard temperature and pressure.

In the formula (I), R represents a tetravalent aromatic group, specifically, (1) a group represented by the following formula:

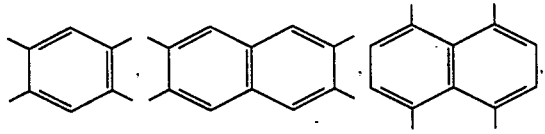

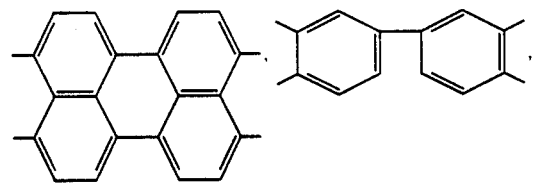

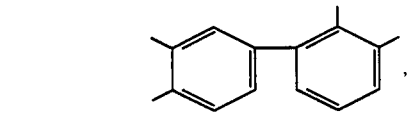

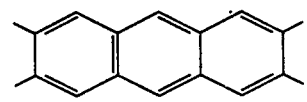

including isomeric groups thereof and derived groups therefrom;

(2) a group represented by the formula (II):

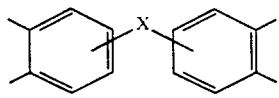

wherein X represents CO, SO$_2$, C(CF$_3$)$_2$, Si(CH$_3$)$_2$, CH$_2$, C(CH$_3$)$_2$ or O, including isomeric groups thereof and derived groups therefrom; and
(3) a non-benzenoid aromatic group having a hetero ring such as:

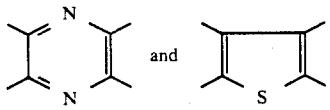

A polyimide having the tetravalent aromatic group (R) in the main polymer chain is generally produced by a reaction of a tetracarboxylic acid dianhydride corresponding thereto and a diamine of the formula H$_2$N—R'—NH$_2$.

Example of such a tetracarboxylic acid dianhydride includes pyromellitic acid dianhydride, 2,3,6,7-naphthalenetetracarboxylic acid dianhydride, 3,4,3',4'-diphenyltetracarboxylic acid dianhydride, 3,4,3',4'-benzophenonetetracarboxylic acid dianhydride, 3,4,3',4'-diphenylsulfone tetracarboxylic acid dianhydride, 3,4,3',4'-diphenylhexafluoroisopropylidenetetracarboxylic acid dianhydride, 3,4,3',4'-diphenyl(trifluoromethyl)methanetetracarboxylic acid dianhydride, 1,4,5,8-naphthalenetetracarboxylic acid dianhydride, pyrazinetetracarboxylic acid dianhydride and 3,4,3',4'-diphenyldimethylmethanetetracarboxylic acid dianhydride. Two or more of the dianhydrides may be used in the reaction.

In the formula (I), R' represents a divalent aromatic group represented by the following formulae (III), (IV) and (V) including isomeric groups thereof and derived groups therefrom, or a hetero ring-containing non-benzenoid aromatic group represented by the following formulae:

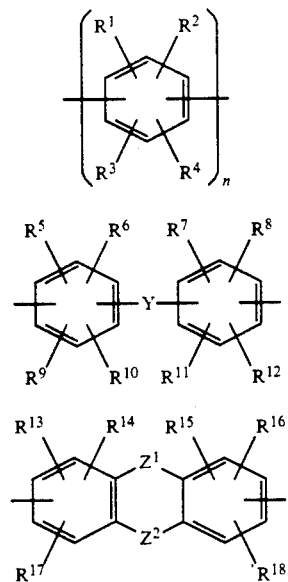

(III)

(IV)

(V)

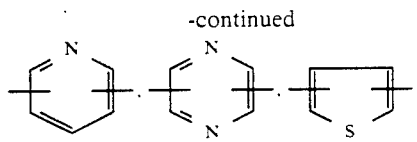

wherein each of R$^1$ to R$^{18}$ independently represents a hydrogen atom, a halogen atom such as fluorine atom, chlorine atom, bromine atom and iodine atom, a nitro group or a C$_1$-C$_{12}$ organic group selected from the group consisting of an alkyl group such as methyl, ethyl, propyl, butyl, i-propyl, i-butyl and t-butyl, an alkenyl group such as allyl, vinyl and butenyl, an alkynyl group such as acetylenyl and 2-propynyl, a cycloalkyl group such as cyclopropyl, cyclopentyl and cyclohexyl, an aryl group such as phenyl and naphthyl, an aralkyl group such as benzyl, an alkoxy group such as methoxy, ethoxy and propoxy, an aryloxy group such as phenoxy and naphthoxy, a carboxyl group and metal salt thereof, an acyl group such as acetyl and propionyl, an acyloxy group such as acetoxy and propionyloxy, and an alkoxycarbonyl group such as carbomethoxy and carboethoxy; n represents an integer from 1 to 4; Y represents CO, SO$_2$, C(CF$_3$)$_2$, CH$_2$, C(CH$_3$)$_2$, O, S or NH; and each of Z$^1$ and Z$^2$ independently represents a direct bond, CH$_2$, CO, SO$_2$, C(CF$_3$)$_2$, C(CH$_3$)$_2$, Si(CH$_3$)$_2$, CH$_2$, O or S.

The polyimide having the constitutional repeating unit of the formula (I) is usually prepared by polycondensing a tetracarboxylic acid dianhydride corresponding to the group (R) and an aromatic diamine corresponding to the group (R') to first prepare a polyamic acid comprising the constitutional repeating unit represented by the following formula (VI):

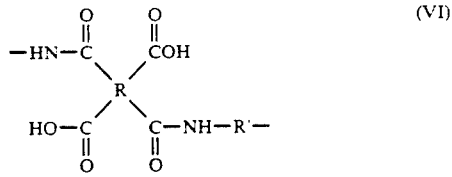

wherein R and R' are the same as defined above, and subjecting the polyamic acid to chemical or thermal ring closing imidization. Any other preparation methods may be also employed as long as a polyimide comprising the constitutional unit of the formula (I) can be prepared by the methods. In the preparation of the polyimide, two or more kinds of the tetracarboxylic acid dianhydrides and/or two or more kinds of the aromatic diamines may be used, and the aromatic polyimide referred to in the present invention includes the copolyimides thus prepared.

As the aromatic diamine for preparing the aromatic polyimide, are exemplified metaphenylenediamine, paraphenylenediamine, 4-chlorometaphenylenediamine, 4-fluorometaphenylenediamine, 4-nitrometaphenylenediamine, 2,4-diaminotoluene, 2,6-diaminotoluene, 4,5-diaminometaxylene, diaminomesitylene, 2,3,5,6-tetramethylparaphenylenediamine, 4-phenoxymetaphenylenediamine, 4-naphthoxymetaphenylenediamine, 3,5-diaminobenzoic acid, sodium 3,5-diaminobenzoate, methyl 3,5-diaminobenzoate, ethyl 3,5-diaminobenzoate, isopropyl 3,5-diaminobenzoate, metaphenylenediamine-2-sulfonic acid, sodium metaphenylenediamine-2-sulfonate, 3,5-diaminodiphenylamine, 2,3,5-trimethylbenzidine, 3,3′,5-trimethylbenzidine, 2,2′,6,6′-tetramethylbenzidine, 3,3′,5,5′-tetramethylbenzidine, 2,2′,5,5′-tetramethylbenzidine, 2,2′,3,3′-tetramethylbenzidine, 2,3′,5,5′-tetramethylbenzidine, 2,2′,3,5-tetramethylbenzidine, 2,3,5,6-tetramethylbenzidine, 2,2′,4,4′-tetramethyl-3,3′-diaminodiphenyl, 2,2′,6,6′-tetraethylbenzidine, 3,3′,5,5′-tetraethylbenzidine, 5,5′-diethyl-3,3′-dimethylbenzidine, 3,3′,5,5′-tetra-n-propylbenzidine, 2,2′-di-i-propyl-5,5′-dimethylbenzidine, 3,3′,5,5′-tetrabromobenzidine, 2,2′,6,6′-tetrabromobenzidine, 3,3′,5,5′-tetrachlorobenzidine, 2,2′,6,6′-tetrachlorobenzidine, 3,3′,5-tribromobenzidine, 4,4′-diamino-5,5′-dimethyl-[1,1′-biphenyl]-3,3′-dicarboxylic acid, 4,4′-diamino-6′-nitro-[1,1′-biphenyl]-2,2′,6-tricarboxylic acid, 3,3′-diphenyl-5,5′-dimethylbenzidine, 3,3′-diphenyl-5,5′-diethylbenzidine, 3,3′,5,5′-tetramethoxybenzidine, 2,2′,6,6′-tetraethoxybenzidine, 3,3-phenoxy-5,5′-dimethylbenzidine, 3,3′,5,5′-tetracyclohexylbenzidine, 3,3′-diallyl-5,5′-dimethylbenzidine, 3,3′-diaminobenzophenone, 3,4′-diaminobenzophenone, 3,3′-diaminodipheyl sulfone, 4,4′-diaminodiphenyl sulfone, bis(3-(3-aminophenoxy)phenyl) sulfone, 2,2-bis(4-aminophenyl)hexafluoropropane, 2,2-bis(4-(4-aminophenoxy)phenyl)hexafluoropropane, 4,4′-diaminodiphenylmethane, 2,2-bis(4-aminophenyl)propane, 2,2-bis(4-(4-aminophenoxy)phenyl)propane, 4,4′-diaminodiphenyl ether, 3,4′-diaminodiphenyl ether, 4,4′-diaminodiphenyl thioether, 4,4′-diaminodiphenylamine, 1,4-diaminoanthraquinone, 1,5-diaminoanthraquinone, 2,7-diaminofluorene, orthotolidine sulfone, 9,9-bis(4-aminphenyl)-fluorene, 3,3′-bisaminophenylbisbenzothiazole, 2,6-diaminopyridine, 2,4-diaminopyridine, 2,6-diaminopyrazine, 3,4-di(4-aminophenyl)-2,5-diphenylthiophene. An aromatic diisocyanate which is derived from each of the above aromatic diamines by substituting amino groups with isocyanato groups may be also used as the starting substance for the aromatic polyimide in place of the aromatic diamines. An aromatic polyimide derived from a benzidine corresponding to the formula (III) wherein n is 2 is preferred because an aromatic polyimide membrane having a hydrogen permeability coefficient at 30° C. of not less than $10^{-9}$ cm$^3$(STP)·cm/cm$^2$·sec·cmHg can be comparatively easily prepared.

The aromatic polyimide membrane to be subjected to fluorination may be prepared by coating or casting a dope solution such as a solution of the aromatic polyimide having the constitutional repeating unit of the formula (I), a solution of a polyamic acid having the constitutional unit of the formula (VI):

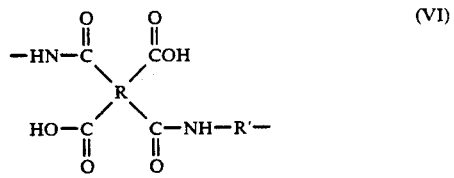

(VI)

wherein R and R′ are the same as defined above, and a solution of a mixture of both of them in a polar solvent on a substrate with a flat surface to form a thin layer of the solution, then evaporating the solvent under an appropriate condition and further, drying it sufficiently. The concentration of the aromatic polyimide and/or polyamic acid in the dope solution depends on the molecular weight of the aromatic polyimide and/or polyamic acid, and usually 2 to 40% by weight.

A method for preparing a dense membrane of aromatic polyimide by using a solution of a polyamic acid of the formula (VI) in an organic polar solvent as the dope is shown below in more detail.

A dope solution is cast on a glass plate, teflon plate, stainless steel plate, steel plate, etc. having flat surface by using a doctor blade, etc. to form a thin layer of about 1 to 40 mil thick at 0° to 100° C. Then, after gradually evaporating the solvent under a normal pressure or a reduced pressure, the temperature is gradually elevated to 150° C. or higher, preferably 200° to 400° C. At this temperature range, the ring closing imidization of the polyamic acid is carried out to form the aromatic polyimide having the constitutional unit of the formula (I) and, at the same time, the solvent is thoroughly removed and the resultant membrane is dried. Preferred result may be obtained by setting the drying temperature to a temperature at which the aromatic polyimide would not melt. The above ring closing imidization may be also carried out by any known chemical methods.

An unsymmetrical aromatic polyimide membrane comprising a dense layer and a porous layer, a mixed membrane of the aromatic polyimide and an organic material including other types of polyimide or inorganic material, and a composite membrane comprising an aromatic polyimide membrane and another porous membrane are also included in the aromatic polyimide membrane to be subjected to fluorination. As a method for forming a thin aromatic polyimide membrane described above, there can be mentioned, for example, a method of spreading a solution of a polyamic acid or an aromatic polyimide on the surface of water, a method of coating a solution of a polyamic acid or an aromatic polyimide on a supporting substrate membrane, a method of coating or impregnating a diamine and an aromatic tetracarboxylic acid dianhydride, which are monomers for the aromatic polyimide or the polyamic acid, on or into a supporting substrate membrane and polymerizing the monomers, or a method of using interfacial polymerization technique, as well as any other known methods. The membrane obtained by the methods described above may be fabricated in the form of flat sheets or hollow fibers.

The aromatic polyimide and the polyamic acid used for preparing an aromatic polyimide membrane are preferred to have a logarithmic viscosity of not less than 0.1 dl/g, preferably from 0.3 to 5 dl/g when measured as an N-methylpyrrolidone solution of a 0.5 g/dl polymer concentration at 30° C.

The logarithmic viscosity is determined in accordance with the formula as defined below:

$$\text{Logarithmic viscosity} = \frac{\text{Natural Logarithm of (viscosity of solution/viscosity of solvent)}}{\text{Polymer concentration in solution}}$$

As the organic polar solvent for the aromatic polyimide or polyamic acid, there can be mentioned, for example, N-methylpyrrolidone, N,N-dimethylformamide, N,N-dimethylacetamide, formamide, dimethylsulfoxide, and tetramethylurea.

The fluorination may be carried out before, during or after the formation of the aromatic polyimide membrane, and preferably carried out after the formation of the membrane by treating with active fluorine.

As active fluorine, fluorine gas, HF gas, $CF_4$, etc. may be used, and preferred is fluorine gas only or a mixed gas of fluorine and another gas.

The fluorination method will be illustrated below taking a method wherein fluorine gas is used as the active fluorine as an example. The aromatic polyimide membrane prepared as described above is subjected to contact treatment in a mixed gas containing fluorine gas in a concentration of not less than 0.001% by volume, preferably from 0.005 to 80% by volume, more preferably from 0.01 to 60% by volume, at a temperature not higher than the glass transition temperature of the aromatic polyimide under a reduced pressure or under pressure. The time period for the contact treatment depends on the fluorine concentration in the gas used, the treatment temperature and the form of the membrane to be treated, and usually in the range from a few second to 48 hours, generally within 10 hours.

The aromatic polyimide membrane used in the present invention is advantageous because the physical properties thereof are not deteriorated by fluorine treatment, and therefore, a wide range of treatment condition may be employed. As examples of a mixed gas of fluorine gas with another gas, are mentioned $F_2/O_2$, $F_2/N_2$, $F_2/He$, $F_2/Ar$, $F_2/Cl_2$, $F_2/CO_2$, $F_2/SO_2$, $F_2/O_2/N_2$, $F_2/Cl_2/N_2$, $F_2/CO_2/N_2$, $F_2/SO_2/N_2$, $F_2/SO_2/Cl_2/N_2$, etc.

The fluorination method other than the above-described may includes electrolytic fluorination reaction using HF, etc., a fluorination carried out in plasma of a fluorine compound such as $CF_4$, and a method wherein a liquid fluorinating agent is used. When the fluorinating agent is liquid, it is necessary to vaporize the agent to effect the fluorination after applying the agent on the aromatic polyimide membrane or dipping the aromatic polyimide membrane in the agent.

The increase in the fluorine content in the fluorinated aromatic polyimide membrane is not specifically restricted, but preferably from 0.3 to 40% by weight, and more preferably not more than 30% by weight based on elemental analysis.

The present aromatic polyimide separation membrane may be used in any of forms such as a flat membrane, a hollow fiber and a spiral-wound element. The fluorination of the aromatic polyimide membrane is usually carried out in a gaseous phase, and therefore, the degree of fluorination can be easily controlled on each of the sides of the aromatic polyimide membrane.

The aromatic polyimide separation membrane of the present invention is highly suitable for a separation membrane due to its extremely high selectivity and high gas permeability.

Further, the aromatic polyimide separation membrane has a high heat stability and high mechanical strength, it can be used more effectively even in a severe condition under high temperature and high pressure, as compared with conventional separation membrane obtained from other organic materials. For instance, it can be used as a membrane for separation of carbon dioxide in the third recovery of petroleum, separation of water vapor, helium, carbon dioxide, carbon disulfide, etc. from natural gases, as well as recovery of hydrogen in petroleum refining and ammonia synthesis plants, separation of carbon monoxide and hydrogen from synthesis gases and iron making gases, separation of oxygen or nitrogen from air for the production of oxygen-enriched air used for combustion and medical application or production of nitrogen as inert gas. Further, since the fluorinated polyimide separation membrane is also excellent in organic solvent resistance, it can be used as a separation membrane for treatment of waste water containing organic solvents by means of reverse osmosis, ultrafiltration or precision filtration. In addition, it is advantageously adopted as a membrane for separation of organic liquid and water by means of pervaporation.

The present invention will be described in more detail referring to the following non-limitative Examples.

The gas permeability is represented by the gas permeability coefficient P represented by the following formula:

$$P = \frac{\text{Gas permeation amount (cm}^3 \cdot \text{STP)} \times \text{Membrane thickness (cm)}}{\text{Membrane area (cm}^2) \times \text{Time (sec)} \times \text{Pressure difference (cmHg)}}$$

wherein STP represents standard temperature and pressure.

The unit for P is indicated by cB (centi barrer).

$$cB = 10^{-12} \frac{\text{cm}^3 \text{ (STP)} \cdot \text{cm}}{\text{cm}^2 \cdot \text{sec} \cdot \text{cmHg}}$$

The gas permeability is measure by using a gas permeation rate measuring device. This is a device in which a predetermined test gas is supplied at a constant pressure on one surface of a test membrane attached to a cell of the device and analyze the amount of the gas which permeates to the other side through the membrane by means of a pressure sensor or gas chromatography.

The selectivity of gas separation factor is represented as a ratio of permeability coefficients for the respective gases measured.

REFERENCE EXAMPLE 1

In a nitrogen atmosphere at room temperature, 5.08 g (21 mmol) of 3,3',5,5'-tetramethylbenzidine (hereinunder referred to as "TMB") was placed in a 300-ml four-necked flask equipped with a stirrer and a nitrogen inlet and then dissolved in 20 ml of N-methylpyrrolidone (hereinunder referred to as "NMP"). To the diamine solution, was added 0.92 g (4.2 mmol) of pyromellitic acid dianhydride (hereinunder referred to as "PMDA") together with 20 ml of NMP and the mixture was stirred for 1 hour. To the resultant mixture, was added 7.47 g (16.8 mmol) of 3,4,3',4'-diphenylhexafluoroisopropylidenetetracarboxylic acid dianhydride (hereinunder referred to as "6FDA") together with 20 ml of NMP.

The mixture was stirred for 10 hours at room temperature, thereby obtaining a viscous solution of a polyimide precursor (polyamic acid) having a polymer concentration of 18 wt %. A part of the solution was diluted with NMP to prepare a solution of a concentration of 0.5 g/dl. The logarithmic viscosity measured at 30° C. was 1.53 dl/g.

REFERENCE EXAMPLE 2

To the polyamic acid solution prepared in Reference Example 1, were added 9 g (84 mmol) of acetic anhydride and 36 ml of NMP. After the mixture was stirred for 1 hour, 9 g (84 mmol) of triethylamine was added thereto and the mixture was stirred for 24 hours to obtain a polyimide solution. The polyimide solution was solidified in water into a shape of fibers, pulverized, washed with methanol and dried under a reduced pressure to obtain a polyimide powder.

The polyimide powder was dissolved in NMP to obtain a 10 wt % solution. The solution was filtered through a filter with 5 μm pore size, and the filtrate was cast on a glass plate at a knife interval of 20 mil by using a doctor knife. The glass plate was dried in an oven at 80° C. for 4 hours in a nitrogen atmosphere, thereby obtaining a self-supporting membrane. The membrane was then separated from the glass plate and heat treated at 120° C. for 4 hours under a reduced pressure. The temperature of the oven was then raised from room temperature to 300° C., and heat treated at 300° C. for 2 hours to obtain a dense polyimide membrane of 1 mil thickness. The contact angle of the membrane with respect to water was 74°.

COMPARATIVE EXAMPLE 1

Using the dense polyimide membrane obtained in Reference Example 2, the permeation of each of the pure gases was measured at 30° C. The results are shown in the following.

| $H_2$ permeability coefficient | 30000 cB |
|---|---|
| $CO_2$ permeability coefficient | 27700 cB |
| $CH_4$ permeability coefficient | 1100 cB |
| $H_2/CH_4$ separation factor | 27 |
| $CO_2/CH_4$ separation factor | 25 |

The permeations of air and a mixed gas of carbon dioxide and methane (containing 20 vol % of carbon dioxide) through the membrane at 35° C. were measured. The results are shown in the following.

| $O_2$ permeability coefficient | 5820 cB |
|---|---|
| $O_2/N_2$ separation factor | 3.75 |
| $CO_2$ permeability coefficient | 29100 cB |
| $CO_2/CH_4$ separation factor | 23 |

EXAMPLE 1

The dense polyimide membrane obtained in Reference Example 2 was deaerated under a reduced pressure for 1 hour, and the deaerated polyimide membrane was subjected to fluorination treatment by contacting the membrane with an $F_2/N_2$ mixed gas having an $F_2$ concentration of 4 vol % for 1 hour at room temperature. The elemental analysis of the treated polyimide membrane showed that the fluorine content in the dense polyimide membrane increased by 4.22 wt % due to the fluorination treatment. The contact angle of the fluorinated membrane with respect to water was 31°.

The permeation of each of the pure gases through the fluorinated dense polyimide membrane at 30° C. was measured. The results are shown in the following.

| $H_2$ permeability coefficient | 9980 cB |
|---|---|
| $CO_2$ permeability coefficient | 1330 cB |
| $CH_4$ permeability coefficient | 16.2 cB |
| $H_2/CH_4$ separation factor | 616 |
| $CO_2/CH_4$ separation factor | 82 |

It is evident that the separation factors increased due to fluorination.

The permeations of air and a mixed gas of carbon dioxide and methane (containing 20 vol % of carbon dioxide) through the fluorinated dense polyimide membrane at 35° C. were measured. The results are shown in the following.

| $O_2$ permeability coefficient | 910 cB |
|---|---|
| $O_2/N_2$ separation factor | 5.61 |
| $CO_2$ permeability coefficient | 2740 cB |
| $CO_2/CH_4$ separation factor | 90 |

EXAMPLE 2

The dense polyimide membrane was subjected to fluorine treatment in the same way as in Example 1 except for using an $F_2/N_2$ mixed gas having an $F_2$ concentration of 8 vol %. The elemental analysis of the treated polyimide membrane showed that the fluorine content in the dense polyimide membrane increased by 8.43 wt % due to the fluorine treatment. The contact angle of the membrane with respect to water was 42°.

The permeations of air and a mixed gas of carbon dioxide and methane (containing 20 vol % of carbon dioxide) through the fluorinated dense polyimide membrane at 35° C. were measured. The results are shown in the following.

| $O_2$ permeability coefficient | 535 cB |
|---|---|
| $O_2/N_2$ separation factor | 6.24 |
| $CO_2$ permeability coefficient | 2210 cB |
| $CO_2/CH_4$ separation factor | 100 |

EXAMPLE 3

The dense polyimide membrane was subjected to fluorine treatment in the same way as in Example 1 except for using an $F_2/N_2$ mixed gas having an $F_2$ concentration of 12 vol %. The elemental analysis of the treated polyimide membrane showed that the fluorine content in the dense polyimide membrane increased by 6.16 wt % due to the fluorine treatment. The contact angle of the membrane with respect to water was 56°.

The permeation of each of the pure gases through the fluorinated dense polyimide membrane at 30° C. was measured. The results are shown in the following.

| $H_2$ permeability coefficient | 11200 cB |
|---|---|
| $CO_2$ permeability coefficient | 2600 cB |
| $CH_4$ permeability coefficient | 37.2 cB |
| $H_2/CH_4$ separation factor | 301 |
| $CO_2/CH_4$ separation factor | 70 |

The permeations of air and a mixed gas of carbon dioxide and methane (containing 20 vol % of carbon dioxide) of the fluorinated dense polyimide membrane at 35° C. were measured. The results are shown in the following.

| $O_2$ permeability coefficient | 985 cB |
|---|---|
| $O_2/N_2$ separation factor | 5.76 |
| $CO_2$ permeability coefficient | 4550 cB |
| $CO_2/CH_4$ separation factor | 87 |

REFERENCE EXAMPLE 3

A copolyimide was produced from 3,3'4,4'-benzophenonetetracarboxylic acid dianhydride (hereinunder referred to as "BTDA") and a diisocyanate mixture of 80 mol % of tolylene diisocyanate (a mixture of about 80 mol % of a 2,4-isomer and about 20 mol % of 2,6-isomer) and 20 mol % of 4,4'-diphenylmethane diisocyanate in accordance with the procedure described in Example 4 in U.S. Pat. No. 3,708,458. N,N'-dimethylformamide was used as the polymerization solvent, and the resin concentration in the solution was 21 wt %. A part of the solution was diluted with NMP to prepare a solution having a concentration of 0.5 g/dl. The logarithmic viscosity of the polymer measured at 30° C. was 0.60 dl/g.

REFERENCE EXAMPLE 4

The polyimide solution prepared in Reference Example 3 was filtered through a filter with 5 μm pore size, and the filtrate was cast on a glass plate at a knife interval of 9 mil by using a doctor knife. The glass plate was dried in an oven at 100° C. for 1 hour in a nitrogen atmosphere, thereby obtaining a self-supporting membrane. The membrane was then separated from the glass plate and heat treated at 120° C. for 4 hours under a reduced pressure. The temperature of the oven was then raised from room temperature to 250° C., and heat treated at 250° C. for 1 hour. The contact angle of the membrane with respect to water was 72°.

COMPARATIVE EXAMPLE 2

The permeations of air and a mixed gas of carbon dioxide and methane (containing 20 vol % of carbon dioxide) through the dense polyimide membrane obtained in Reference Example 4 were measured at 35° C. The results are shown in the following.

| | |
|---|---|
| $O_2$ permeability coefficient | 33.4 cB |
| $O_2/N_2$ separation factor | 7.84 |
| $CO_2$ permeability coefficient | 163 cB |
| $CO_2/CH_4$ separation factor | 74 |

EXAMPLE 4

The dense polyimide membrane obtained in Reference Example 4 was deaerated under a reduced pressure for 1 hour, and subjected to fluorine treatment by bringing the deaerated polyimide membrane into contact with an $F_2/N_2$ mixed gas having an $F_2$ concentration of 12 vol % at room temperature. The elemental analysis of the treated polyimide membrane showed that the fluorine content in the dense polyimide membrane increased by 2.80 wt % due to the fluorine treatment. The contact angle of the membrane with respect to water was 13°.

The permeations of air and a mixed gas of carbon dioxide and methane (containing 20 vol % of carbon dioxide) through the fluorinated dense polyimide membrane were measured at 35° C. The results are shown in the following.

| | |
|---|---|
| $O_2$ permeability coefficient | 40.1 cB |
| $O_2/N_2$ separation factor | 9.31 |
| $CO_2$ permeability coefficient | 146 cB |
| $CO_2/CH_4$ separation factor | 97 |

REFERENCE EXAMPLE 5

In a nitrogen atmosphere at room temperature, 5.08 g (21 mmol) of TMB was placed in a 300-ml four-necked flask equipped with a stirrer and a nitrogen inlet and 30 ml of NMP was added to dissolve TMB. Into the diamine solution, was added 9.33 g (21 mmol) of 6FDA together with 30 ml of NMP. The mixture was stirred for 10 hours at room temperature, thereby obtaining a viscous solution of a polyimide precursor (polyamic acid) having a polymer concentration of 20 wt %. A part of the solution was diluted with NMP to prepare a solution having a concentration of 0.5 g/dl. The logarithmic viscosity of the polymer measured at 30° C. was 1.57 dl/g.

REFERENCE EXAMPLE 6

To the polyamic acid solution prepared in Reference Example 5, were added 9 g (84 mmol) of acetic anhydride and 36 ml of NMP. After the mixture was stirred for 1 hour, 9 g (84 mmol) of triethylamine was added thereto and the mixture was stirred for 24 hours to obtain a polyimide solution. The polyimide solution was solidified in water into a shape of fibers, pulverized, washed with methanol and dried under a reduced pressure to obtain polyimide powder.

The polyimide powder was dissolved in NMP to obtain a 10 wt % solution. The solution was filtered through a filter with 5 μm pore size, and the filtrate was cast on a glass plate at a knife interval of 20 mil by using a doctor knife. The glass plate was dried in an oven at 80° C. for 4 hours in a nitrogen atmosphere, thereby obtaining a self-supporting membrane. The membrane was then separated from the glass plate and heat treated at 120° C. for 4 hours under a reduced pressure. The temperature of the oven was then raised from room temperature to 300° C., and heat treated at 300° C. for 2 hours to obtain a dense polyimide membrane of 1 mil thickness. The contact angle of the membrane with respect to water was 79°.

COMPARATIVE EXAMPLE 3

Using the dense polyimide membrane obtained in Reference Example 6, the permeation of each of the pure gases was measured at 30° C. The results are shown in the following.

| | |
|---|---|
| $H_2$ permeability coefficient | 22700 cB |
| $CO_2$ permeability coefficient | 22300 cB |
| $CH_4$ permeability coefficient | 860 cB |
| $H_2/CH_4$ separation factor | 26 |
| $CO_2/CH_4$ separation factor | 26 |

The permeations of air and a mixed gas of carbon dioxide and methane (containing 20 vol % of carbon dioxide) through the dense polyimide membrane obtained in Reference Example 6 were measured at 35° C. The results are shown in the following.

| | |
|---|---|
| $O_2$ permeability coefficient | 3080 cB |
| $O_2/N_2$ separation factor | 4.25 |
| $CO_2$ permeability coefficient | 23500 cB |
| $CO_2/CH_4$ separation factor | 26 |

EXAMPLE 5

The dense polyimide membrane obtained in Reference Example 6 was deaerated under a reduced pressure for 1 hour, and subjected to fluorine treatment by bringing the deaerated polyimide membrane into contact with an $F_2/N_2$ mixed gas having an $F_2$ concentration of 0.05 vol % at room temperature. The elemental analysis of the treated polyimide membrane showed that the fluorine content in the dense polyimide membrane increased by 0.73 wt % due to the fluorine treatment. The contact angle of the membrane with respect to water was 69°.

The permeation of each of the pure gases through the fluorinated dense polyimide membrane at 30° C. was measured. The results are shown in the following.

| $H_2$ permeability coefficient | 22500 cB |
| --- | --- |
| $CO_2$ permeability coefficient | 13800 cB |
| $CH_4$ permeability coefficient | 284 cB |
| $H_2/CH_4$ separation factor | 79 |
| $CO_2/CH_4$ separation factor | 49 |

The permeations of air and a mixed gas of carbon dioxide and methane (containing 20 vol % of carbon dioxide) through the fluorinated dense polyimide membrane at 35° C. were measured. The results are shown in the following.

| $O_2$ permeability coefficient | 3990 cB |
| --- | --- |
| $O_2/N_2$ separation factor | 4.35 |
| $CO_2$ permeability coefficient | 16600 cB |
| $CO_2/CH_4$ separation factor | 48 |

EXAMPLE 6

The dense polyimide membrane was subjected to fluorine treatment in the same way as in Example 5 except for using an $F_2/N_2$ mixed gas having an $F_2$ concentration of 0.5 vol %. The elemental analysis of the treated polyimide membrane showed that the fluorine content in the dense polyimide membrane increased by 2.22 wt % due to the fluorine treatment. The contact angle of the membrane with respect to water was 54°.

The permeation of each of the pure gases through the fluorinated dense polyimide membrane at 30° C. was measured. The results are shown in the following.

| $H_2$ permeability coefficient | 7690 cB |
| --- | --- |
| $CO_2$ permeability coefficient | 772 cB |
| $CH_4$ permeability coefficient | 7.3 cB |
| $H_2/CH_4$ separation factor | 1053 |
| $CO_2/CH_4$ separation factor | 106 |

The permeations of air and a mixed gas of carbon dioxide and methane (containing 20 vol % of carbon dioxide) through the fluorinated dense polyimide membrane at 35° C. were measured. The results are shown in the following.

| $O_2$ permeability coefficient | 482 cB |
| --- | --- |
| $O_2/N_2$ separation factor | 6.77 |
| $CO_2$ permeability coefficient | 1450 cB |
| $CO_2/CH_4$ separation factor | 133 |

EXAMPLE 7

The dense polyimide membrane was subjected to fluorine treatment in the same way as in Example 5 except for using an $F_2/N_2$ mixed gas having an $F_2$ concentration of 4 vol %. The elemental analysis of the treated polyimide membrane showed that the fluorine content in the dense polyimide membrane increased by 9.45 wt % due to the fluorine treatment. The contact angle of the membrane with respect to water was 14°.

| $H_2$ permeability coefficient | 7570 cB |
| --- | --- |
| $CO_2$ permeability coefficient | 1590 cB |
| $CH_4$ permeability coefficient | 33.9 cB |
| $H_2/CH_4$ separation factor | 223 |
| $CO_2/CH_4$ separation factor | 47 |

The permeations of air and a mixed gas of carbon dioxide and methane (containing 20 vol % of carbon dioxide) through the fluorinated dense polyimide membrane at 35° C. were measured. The results are shown in the following.

| $O_2$ permeability coefficient | 1270 cB |
| --- | --- |
| $O_2/N_2$ separation factor | 5.10 |
| $CO_2$ permeability coefficient | 3530 cB |
| $CO_2/CH_4$ separation factor | 82 |

REFERENCE EXAMPLE 7

In a nitrogen atmosphere at room temperature, 5.08 g (21 mmol) of TMB was placed in a 300-ml four-necked flask equipped with a stirrer and a nitrogen inlet and 20 ml of NMP was added to dissolve TMB. To the diamine solution, was added 2.03 g (6.3 mmol) of BTDA together with 20 ml of NMP and the mixture was stirred for 1 hour. To the resultant mixture, was added 6.54 g (14.7 mmol) of 6FDA together with 20 ml of NMP.

The mixture was stirred for 10 hours at room temperature, thereby obtaining a viscous solution of a polyimide precursor (polyamic acid) having a polymer concentration of 19 wt %. A part of the solution was diluted with NMP to prepare a solution having a concentration of 0.5 g/dl . The logarithmic viscosity of the polymer measured at 30° C. was 1.44 dl/g.

REFERENCE EXAMPLE 8

To the polyamic acid solution prepared in Reference Example 7, were added 9 g (84 mmol) of acetic anhydride and 36 ml of NMP. After the mixture was stirred for 1 hour, 9 g (84 mmol) of triethylamine was added thereto and the mixture was stirred for 24 hours to obtain a polyimide solution. The polyimide solution was solidified in water into a shape of fibers, pulverized, washed with methanol and dried under a reduced pressure to obtain polyimide powder.

The polyimide powder was dissolved in NMP to obtain a 10 wt % solution. The solution was filtered through a filter with 5 μm pore size, and the filtrate was cast on a glass plate at a knife interval of 20 mil by using a doctor knife. The glass plate was dried in an oven at 80° C. for 4 hours in a nitrogen atmosphere, thereby obtaining a self-supporting membrane. The membrane was then separated from the glass plate and heat treated at 120° C. for 4 hours under a reduced pressure. The temperature of the oven was then raised from room temperature to 300° C., and heat treated at 300° C. for 1 hour to obtain a dense polyimide membrane of 1 mil thickness. The contact angle of the membrane with respect to water was 75°.

COMPARATIVE EXAMPLE 4

The permeations of air and a mixed gas of carbon dioxide and methane (containing 20 vol % of carbon dioxide) through the dense polyimide membrane obtained in Reference Example 8 were measured at 35° C. The results are shown in the following.

| $O_2$ permeability coefficient | 2280 cB |
|---|---|
| $O_2/N_2$ separation factor | 4.59 |
| $CO_2$ permeability coefficient | 19800 cB |
| $CO_2/CH_4$ separation factor | 26 |

EXAMPLE 8

The dense polyimide membrane obtained in Reference Example 8 was deaerated under a reduced pressure for 1 hour, and subjected to fluorine treatment by bringing the deaerated polyimide membrane into contact with an $F_2/N_2$ mixed gas having an $F_2$ concentration of 4 vol % at room temperature. The elemental analysis of the treated polyimide membrane showed that the fluorine content in the dense polyimide membrane increased by 5.02 wt % due to the fluorine treatment. The contact angle of the membrane with respect to water was 23°.

The permeations of air and a mixed gas of carbon dioxide and methane (containing 20 vol % of carbon dioxide) of the fluorinated dense polyimide membrane at 35° C. were measured. The results are shown in the following.

| $O_2$ permeability coefficient | 795 cB |
|---|---|
| $O_2/N_2$ separation factor | 5.48 |
| $CO_2$ permeability coefficient | 3190 cB |
| $CO_2/CH_4$ separation factor | 90 |

EXAMPLE 9

The dense polyimide membrane was subjected to fluorine treatment in the same way as in Example 8 except for using an $F_2/N_2$ mixed gas having an $F_2$ concentration of 30 vol %. The elemental analysis of the treated polyimide membrane showed that the fluorine content in the dense polyimide membrane increased by 8.60 wt % due to the fluorine treatment. The contact angle of the membrane with respect to water was 15°.

The permeations of air and a mixed gas of carbon dioxide and methane (containing 20 vol % of carbon dioxide) of the fluorinated dense polyimide membrane at 35° C. were measured. The results are shown in the following.

| $O_2$ permeability coefficient | 976 cB |
|---|---|
| $O_2/N_2$ separation factor | 5.37 |
| $CO_2$ permeability coefficient | 2970 cB |
| $CO_2/CH_4$ separation factor | 80 |

REFERENCE EXAMPLE 9

In a nitrogen atmosphere at room temperature, 5.08 g (21 mmol) of TMB was placed in a 300-ml four-necked flask equipped with a stirrer and a nitrogen inlet and 30 ml of NMP was added to dissolve TMB. To the diamine solution, was added 4.58 g (21 mmol) of PMDA together with 30 ml of NMP and the mixture was stirred for 10 hours at room temperature, thereby obtaining a viscous solution of a polyimide precursor (polyamic acid) having a polymer concentration of 13 wt %. A part of the solution was diluted with NMP to prepare a solution having a concentration of 0.5 g/dl. The logarithmic viscosity of the polymer measured at 30° C. was 1.72 dl/g.

REFERENCE EXAMPLE 10

The polyamic acid solution prepared in Reference Example 9 was filtered through a filter with 5 μm pore size, and the filtrate was cast on a glass plate at a knife interval of 10 mil by using a doctor knife. The glass plate was dried in an oven at 100° C. for 1 hour in a nitrogen atmosphere. The temperature of the oven was then raised to 300° C. and the glass plate was heat treated at 300° C. for 1 hour. The glass plate was then gradually cooled, thereby obtaining a polyimide membrane of 1 mil thickness. The contact angle of the polyimide membrane with respect to water was 54°.

COMPARATIVE EXAMPLE 5

The permeations of air and a mixed gas of carbon dioxide and methane (containing 20 vol % of carbon dioxide) through the polyimide membrane obtained in Reference Example 10 were measured at 35° C. The results are shown in the following.

| $O_2$ permeability coefficient | 1120 cB |
|---|---|
| $O_2/N_2$ separation factor | 3.70 |
| $CO_2$ permeability coefficient | 3530 cB |
| $CO_2/CH_4$ separation factor | 34 |

EXAMPLE 10

The dense polyimide membrane obtained in Reference Example 10 was deaerated under a reduced pressure for 1 hour, and subjected to fluorine treatment by bringing the deaerated polyimide membrane into contact with an $F_2/N_2$ mixed gas having an $F_2$ concentration of 0.05 vol % at room temperature. The elemental analysis of the treated polyimide membrane showed that the fluorine content in the dense polyimide membrane increased by 0.30 wt % due to the fluorine treatment. The contact angle of the membrane with respect to water was 56°.

The permeations of air and a mixed gas of carbon dioxide and methane (containing 20 vol % of carbon dioxide) through the fluorinated dense polyimide membrane at 35° C. were measured. The results are shown in the following.

| $O_2$ permeability coefficient | 757 cB |
|---|---|
| $O_2/N_2$ separation factor | 5.16 |
| $CO_2$ permeability coefficient | 3880 cB |
| $CO_2/CH_4$ separation factor | 52 |

REFERENCE EXAMPLE 11

In a nitrogen atmosphere at room temperature, 5.08 g (21 mmol) of 2,2',6,6'-tetramethylbenzidine (2,6-TMB) was placed in a 300-ml four-necked flask equipped with a stirrer and a nitrogen inlet and 30 ml of NMP was added to dissolve 2,6-TMB. To the diamine solution, was added 4.58 g (21 mmol) of PMDA together with 30 ml of NMP and the mixture was stirred for 10 hours at room temperature, thereby obtaining a viscous solution of a polyimide precursor (polyamic acid) having a polymer concentration of 13 wt %. A part of the solution was diluted with NMP to prepare a solution having a concentration of 0.5 g/dl. The logarithmic viscosity of the polymer measured at 30° C. was 1.36 dl/g.

REFERENCE EXAMPLE 12

A dense polyimide membrane of 1 mil thickness was obtained from the solution prepared in Reference Example 11 in the same way as in Reference Example 10. The contact angle of the polyimide membrane with respect to water was 75°.

COMPARATIVE EXAMPLE 6

The permeation of a mixed gas of carbon dioxide and methane (containing 20 vol % of carbon dioxide) through the dense polyimide membrane obtained in Reference Example 12 was measured at 35° C. The results are shown in the following.

| CO$_2$ permeability coefficient | 2010 cB |
|---|---|
| CO$_2$/CH$_4$ separation factor | 53 |

EXAMPLE 11

The dense polyimide membrane obtained in Reference Example 12 was deaerated under a reduced pressure for 1 hour, and subjected to fluorine treatment by bringing the deaerated polyimide membrane into contact with an F$_2$/N$_2$ mixed gas having an F$_2$ concentration of 4 vol % at room temperature. The elemental analysis of the treated polyimide membrane showed that the fluorine content in the dense polyimide membrane increased by 1.32 wt % due to the fluorine treatment. The contact angle of the membrane with respect to water was 13°.

The permeation of a mixed gas of carbon dioxide and methane (containing 20 vol % of carbon dioxide) through the fluorinated dense polyimide membrane at 35° C. were measured. The results are shown in the following.

| O$_2$ permeability coefficient | 901 cB |
|---|---|
| CO$_2$/CH$_4$ separation factor | 167 |

What is claimed is:

1. An aromatic polyimide separation membrane prepared by subjecting an aromatic polyimide membrane to fluorine treatment with an active fluorine.

2. An aromatic polyimide separation membrane according to claim 1, wherein the hydrogen permeability coefficient of said aromatic polyimide membrane at 30° C. is not less than $10^{-9}$ cm$^3$(STP)·cm/cm$^2$·sec·cmHg.

3. An aromatic polyimide separation membrane according to claim 1, wherein said aromatic polyimide membrane comprises an aromatic polyimide consisting essentially of the constitutional repeating unit represented by the following formula (I):

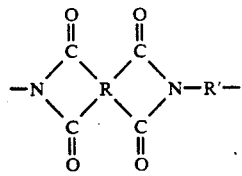

(I)

wherein R represents a tetravalent aromatic group and R' represents a divalent aromatic group.

4. An aromatic polyimide separation membrane according to claim 3, wherein R in the formula (I) is a tetravalent aromatic group selected from the group consisting of (1) a group represented by the following formula:

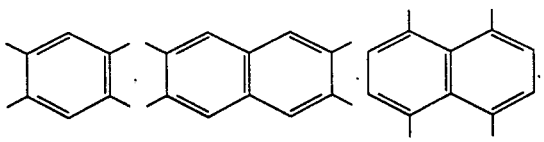

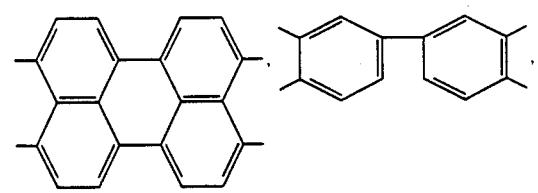

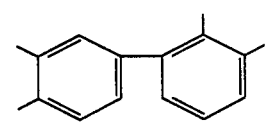

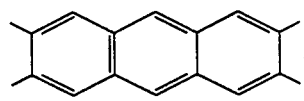

including isomeric groups thereof and derived groups therefrom;

(2) a group represented by the formula (II):

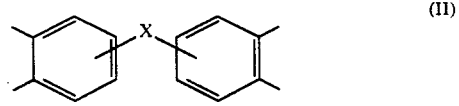

(II)

wherein X represents CO, SO$_2$, C(CF$_3$)$_2$, Si(CH$_3$)$_2$, CH$_2$, C(CH$_3$)$_2$ or O, including isomeric groups thereof and derived groups therefrom; and (3) a non-benzenoid aromatic group having a hetero ring of the formula:

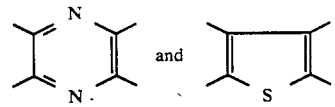

and

5. An aromatic polyimide separation membrane according to claim 3, wherein R' in the formula (I) is a divalent aromatic group selected from the group consisting of the groups represented by the following formulae (III), (IV) and (V), and hereto ring-containing non-benzenoid aromatic groups represented by the following formula:

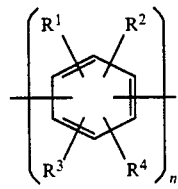

(III)

-continued

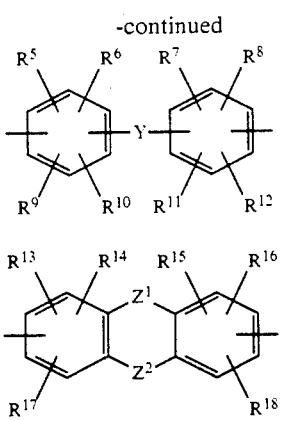

(IV)

(V)

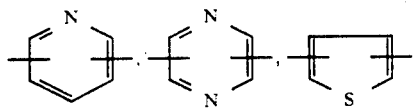

wherein each of $R^1$ to $R^{18}$ independently represents a hydrogen atom, a halogen atom, a nitro group or a $C_1$-$C_{12}$ organic group selected from the group consisting of an alkyl group, an alkenyl group, an alkynyl group, a cycloalkyl group, an aryl group, an aralkyl group, an alkoxy group, an aryloxy group, a carboxyl group and metal salt thereof, an acyl group, an acyloxy group, and an alkoxycarbonyl group; n represents an integer from 1 to 4; Y represents CO, $SO_2$, $C(CF_3)_2$, $Si(CH_3)_2$, $CH_2$, $C(CH_3)_2$, O, S or NH; and each of $Z^1$ and $Z^2$ independently represents a direct bond, $CH_2$, CO, $SO_2$, $C(CF_3)_2$, $C(CH_3)_2$, $Si(CH_3)_2$, $CH_2$, O or S.

6. An aromatic polyimide separation membrane according to claim 1, wherein said aromatic polyimide membrane is prepared by the process comprising:

dissolving an aromatic polyimide comprising the constitutional repeating unit represented by the following formula (I):

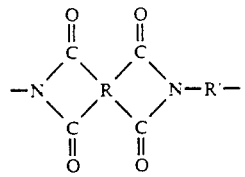

(I)

wherein R represents a tetravalent aromatic group and R' represents a divalent aromatic group, an polyamic acid comprising the constitutional repeating unit represented by the following formula (VI):

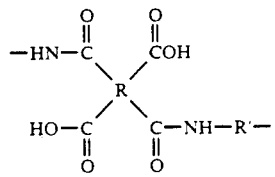

(VI)

wherein R and R' are the same as defined above, or a mixture of said aromatic polyimide and polyamic acid into an organic polar solvent;
forming a thin layer of said solution;
evaporating the solvent from said thin layer; and
drying the evaporated thin layer to form said aromatic polyimide membrane.

7. An aromatic polyimide separation membrane according to claim 1, wherein said active fluorine is selected from the group consisting of fluorine gas, HF gas, $CF_4$ gas and a mixed gas of fluorine gas with another gas.

* * * * *

UNITED STATES PATENT AND TRADEMARK OFFICE
CERTIFICATE OF CORRECTION

PATENT NO. : 5,112,941

DATED : May 12, 1992

INVENTOR(S) : T. Kasai, et al.

It is certified that error appears in the above-identified patent and that said Letters Patent is hereby corrected as shown below:

On the title page, left-hand column, below date of application filing, please insert the following:

```
[30]  Foreign Application Priority Data
      July 5, 1989 [JP] Japan ............... 1-173678
```

Signed and Sealed this

Twentieth Day of July, 1993

Attest:

MICHAEL K. KIRK

*Attesting Officer*    Acting Commissioner of Patents and Trademarks